US009979209B2

(12) United States Patent
Wolff et al.

(10) Patent No.: US 9,979,209 B2
(45) Date of Patent: May 22, 2018

(54) BATTERY MANAGEMENT SYSTEM FOR GENERATING A PERIODIC ALTERNATING VOLTAGE BASED ON BATTERY STATE OF WEAR

(71) Applicants: Robert Bosch GmbH, Stuttgart (DE); Samsung SDI Co., Ltd., Yongin-si, Gyeonggi-do (KR)

(72) Inventors: Hans-Joerg Wolff, Schorndorf (DE); Hans Partes, Asperg (DE); Joachim Fetzer, Bad-Ditzenbach (DE); Stefan Butzmann, Schalksmühle (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 366 days.

(21) Appl. No.: 14/427,769

(22) PCT Filed: Jul. 18, 2013

(86) PCT No.: PCT/EP2013/065139
§ 371 (c)(1),
(2) Date: Mar. 12, 2015

(87) PCT Pub. No.: WO2014/040780
PCT Pub. Date: Mar. 20, 2014

(65) Prior Publication Data

US 2015/0249351 A1 Sep. 3, 2015

(30) Foreign Application Priority Data

Sep. 12, 2012 (DE) ........................ 10 2012 216 158

(51) Int. Cl.
*H02J 7/00* (2006.01)
*H02M 7/483* (2007.01)
(Continued)

(52) U.S. Cl.
CPC ......... *H02J 7/0014* (2013.01); *B60L 11/1809* (2013.01); *B60L 11/1853* (2013.01);
(Continued)

(58) Field of Classification Search
CPC ...... H02J 7/0014; H02J 7/0063; H02J 7/0065; H02J 2007/0067
(Continued)

(56) References Cited

U.S. PATENT DOCUMENTS 3,867,643 A * 2/1975 Baker ..................... H02M 7/49 307/117
4,238,820 A * 12/1980 Naaijer ................. H02M 7/483 323/906
(Continued)

FOREIGN PATENT DOCUMENTS

DE 10 2010 027 864 A1 12/2011
DE 10 2010 041 028 A1 3/2012
(Continued)

OTHER PUBLICATIONS

International Search Report corresponding to PCT Application No. PCT/EP2013/065139, dated Aug. 28, 2014 (German and English language document) (8 pages).

*Primary Examiner* — Edward Tso
*Assistant Examiner* — Manuel Hernandez
(74) *Attorney, Agent, or Firm* — Maginot, Moore & Beck LLP

(57) ABSTRACT

A battery management system for a battery module string includes battery modules. The battery modules are electrically connectable to poles of the battery module string and individually electrically disconnectable. The battery module string is configured to generate an AC voltage by disconnecting and connecting the battery modules. The battery management system is configured to assign a respective first
(Continued)

time period to each first battery module of the battery modules based on position of each first battery module in a battery module list. Each of the first battery module is electrically connected within a half-cycle of the AC voltage during the respective first time period.

7 Claims, 5 Drawing Sheets

(51) Int. Cl.
*B60L 11/18* (2006.01)
*H01M 10/44* (2006.01)
*H01M 10/42* (2006.01)

(52) U.S. Cl.
CPC ....... *B60L 11/1864* (2013.01); *H01M 10/441* (2013.01); *H02J 7/0063* (2013.01); *H02J 7/0065* (2013.01); *H02M 7/483* (2013.01); *H01M 2010/4271* (2013.01); *H01M 2220/20* (2013.01); *H02J 2007/0067* (2013.01); *Y02T 10/7011* (2013.01); *Y02T 10/7061* (2013.01)

(58) Field of Classification Search
USPC ....... 320/116, 118, 120, 121, 122, 124, 127, 320/135, 136
See application file for complete search history.

(56) References Cited

U.S. PATENT DOCUMENTS

| | | | | |
|---|---|---|---|---|
| 5,453,643 | A * | 9/1995 | Yang | H02M 7/483 307/71 |
| 2011/0198936 | A1 | 8/2011 | Graovac et al. | |
| 2012/0013304 | A1* | 1/2012 | Murase | B60L 11/1864 320/116 |
| 2012/0256568 | A1* | 10/2012 | Lee | H02J 7/0024 318/139 |
| 2012/0262106 | A1 | 10/2012 | Omiya et al. | |

FOREIGN PATENT DOCUMENTS

| | | | |
|---|---|---|---|
| WO | 2010/088944 | A2 | 8/2010 |
| WO | 2012/104957 | A1 | 8/2012 |

* cited by examiner

BATTERY MANAGEMENT SYSTEM FOR GENERATING A PERIODIC ALTERNATING VOLTAGE BASED ON BATTERY STATE OF WEAR

This application is a 35 U.S.C. § 371 National Stage Application of PCT/EP2013/065139, filed on Jul. 18, 2013, which claims the benefit of priority to Serial No. DE 10 2012 216 158.9, filed on Sep. 12, 2012 in Germany, the disclosures of which are incorporated herein by reference in their entirety.

The present disclosure relates to a method for generating a periodic AC voltage using a battery module string and a battery management system for a battery module string. The battery module string comprises battery modules which are electrically connectable, individually or in series, to poles of the battery module string and which are electrically disconnectable individually, each battery module having at least one battery cell, for example a lithium-ion battery cell, as is used, for example, in battery systems of electric or hybrid motor vehicles, i.e. in motor vehicles having at least partially or temporarily electrically operated drives. Therefore, the disclosure also relates to a motor vehicle and a battery system.

BACKGROUND

Owing to improved storage capacity, more frequent rechargeability and increased energy densities, batteries for example batteries based on lithium-ion cells or nickel metal hydride batteries, are used in ever broader applications. Batteries having a lower energy storage capacity are used, for example, for small portable electronic appliances such as mobile telephones, laptops, camcorders or the like, while batteries with a high capacity are used as energy source for the drive of motors of hybrid or electric vehicles, etc. or as stationary batteries.

Batteries can be formed, for example, by interconnecting battery modules in series, wherein there are sometimes also parallel interconnections of the battery modules, and the battery modules for their part can also consist of battery cells connected in series and/or parallel.

For driving motors of hybrid or electric vehicles, in particular polyphase battery systems are suitable, which are also referred to as battery direct inverters (BDIs) and are described in DE 10 2010 027 864. BDIs comprise battery modules and coupling units assigned to the modules. The battery modules are individually electrically connectable and electrically disconnectable by means of the coupling units, optionally with the possibility of choosing between a positive and a negative connection.

FIG. 1 shows a battery module 60 comprising a coupling unit 50. A plurality of battery cells 11 is connected in series between the inputs of a coupling unit 50. This battery module 60 is not restricted to such a series circuit of battery cells 11; only a single battery cell 11 can also be provided, or else a parallel circuit or mixed series-parallel circuit of battery cells 11. The first output of the coupling unit 50 is connected to a first terminal 61, and the second output of the coupling unit 40 is connected to a second terminal 62. The battery cells 11 can be decoupled from the rest of the battery on both sides by the coupling unit 50, which enables hazard-free replacement during running operation, for example, since the hazardous high summation voltage of the rest of the battery modules of the battery is not present at any pole of the battery cells 11.

FIG. 2 shows a battery which has n battery module strings 70-1 to **70-*m*. Each battery module string 70-1 to 70-*m* has a plurality of battery modules 60, wherein preferably each battery module string 70-1 to 70-*m* has the same number of battery modules 60 and each battery module 60 has the same number of battery cells 11 interconnected identically. One pole of each battery module string 70-1 to 70-*m* can be connected to a corresponding pole of the other battery module strings 70-1 to 70-*m*, which is indicated by a dashed line in FIG. 2. In general, a battery module string 70-1 to 70-*m* can contain any number of battery modules 60 greater than 1 and a battery can contain any number of battery module strings 70-1 to 70-*m*. In addition, charging and disconnecting devices and disconnecting devices can also be provided at the poles of the battery module strings 70-1 to 70-*m* when safety requirements demand this. However, such disconnecting devices are not necessary because decoupling of the battery cells 11 from the battery connections can take place by the coupling units 30 or 50 contained in the battery modules 60**.

FIG. 3 shows a drive system comprising a battery. In the example shown, the battery has three battery module strings 70-1, 70-2 and 70-3, which are each connected directly to an input of a drive motor 13 designed for operation with three phase signals. By virtue of a control unit of the battery activating (or deactivating) a variable number of battery modules 60 in a battery module string, a voltage which is proportional to the number of activated battery modules 60 and which may be between 0 V and the total output voltage of the battery module string is made available at the output of the battery module string.

Therefore, the polyphase battery system can be used by corresponding connection and disconnection of the modules to generate a plurality of AC voltages which are phase-shifted with respect to one another. Given a corresponding design, for example, three AC voltage profiles which approximate sinusoidal curves and are phase-shifted with respect to one another can be generated, as a result of which a rotating field which can be used directly for driving electric or hybrid motors is generated. The voltage is in this case selected such that the alternating current which is set brings about the torque which is required for operating the motor.

FIG. 4 shows a profile over time of an output voltage of a battery module string. The output voltage of one battery module string V is in this case plotted over time t. An (ideal) sine wave which is desired for an exemplary intended application but which only has voltage values greater than or equal to zero is plotted using the reference symbol **80-*b*. The ideal sine wave is generated approximately by the battery module string by a discrete-value voltage curve 80-*a*. The discrepancies between the discrete-value voltage curve 80-*a* and the ideal curve 80-*b* are dependent in terms of size on the number of battery cells 11 which are connected in series in a battery module 60. The fewer battery cells 11 are connected in series in a battery module 60, the more precisely the discrete-value voltage curve 80-*a* can follow the idealized curve 80-*b***. In customary applications, the comparatively small discrepancies do not impair the operation of the entire system, however.

Battery management systems are used for battery management, for example for basic actuation of modules, for increasing the safety of batteries, for increasing efficiency and for extending the life of battery modules and battery systems comprising battery modules. One function of battery management systems is to record current intensity and/or voltage profiles over time with an accuracy and sampling frequency that is necessary for determining a present state of charge and/or a present state of ageing, an internal impedance, a temperature value and/or the value of another characteristic variable of the individual battery modules.

Although the production of the battery cells is standardized and excellent production methods are implemented by the cell manufacturer, differences in the electrical properties, for example with respect to voltage, capacitance or internal resistance, are observed. In addition to these differences which arise owing to the production process, ageing processes cause a further change in the electrical properties of the battery cells. In a battery module comprising one or more cells, the individual battery cells are therefore never identical in respect of the electrical power. In particular in the case of a series interconnection of the cells in a module, the response of the module is determined by the electrical characteristic of the weakest cell. Therefore, the individual battery modules likewise have individual electrical characteristics.

SUMMARY

A balancing method between the modules of a battery is described in the present application.

In particular, the disclosure describes a battery management system according to claim 1 for a battery module string comprising battery modules which are electrically connectable, individually or in series, to poles of the battery module string and are electrically disconnectable individually.

In this case, the battery module string is suitable for generating an AC voltage by disconnection and connection of the battery modules, the battery management system is characterized in that it is configured to assign a respective time period during which the battery module is electrically connected within a half-cycle of the AC voltage to each battery module depending on its position in a battery module list.

This enables dynamic management of the loading of the battery modules by dynamic management of the battery module list.

In a possible embodiment, the battery management system comprises an apparatus for receiving transmitted voltage profiles of the battery modules and means for using the measured profile for determining a state of wear of the respective battery module. In this case, the battery management system is designed to use the determined states for arranging the battery modules in the battery module list so that the battery modules in the battery module list are arranged according to increasing wear. Furthermore, the battery management system is configured to assign a time period to a battery module which has been subjected to less wear, which time period is longer than a time period assigned to a battery module which has been subjected to comparatively greater wear.

In this or another embodiment, the battery management system can be configured to determine the number and duration of interruptions for dividing the respective time period into partial time periods separate from one another, wherein the number and duration of the interruptions are dependent on a voltage made available by the respective battery module and a desired voltage profile of the AC voltage between a start time and an end time of the respective time period.

Furthermore, a battery system as claimed in claim 4 is proposed for generating at least one AC voltage. The battery system comprises at least one battery module string comprising battery modules which are electrically connectable, individually or in series, to poles of the battery module string and are electrically disconnectable individually, and a battery management system according to the disclosure.

Also described is a motor vehicle which comprises an at least temporarily or partially electrically operable drive unit and a battery system as claimed in claim 4.

Furthermore, a method for generating a periodic AC voltage is proposed, wherein the AC voltage is generated at poles of a battery system comprising battery modules. In this case, the battery system makes it possible for each of the battery modules to be connected electrically individually to the poles or disconnected electrically from the poles. The AC voltage is generated by changing electrical connection states of the battery modules to the poles, wherein, in a half-cycle, each battery module is electrically connected for different lengths of time. The method is characterized by the fact that a respective time period during which a respective battery module is intended to be electrically connected during the half-cycle is assigned at least to a position of the respective battery module in a battery module list. That is to say that the respective time period during which the respective battery module is intended to be electrically connected during the half-cycle is dependent at least on a position of the respective battery module in a battery module list.

In one possible embodiment, the method comprises, for each of the battery modules, the steps of measuring a profile of at least one voltage of the respective battery module and using the measured profile for determining a state of wear of the respective battery module. In the possible embodiment, the method furthermore comprises using the determined states for arranging the battery modules in the battery module list so that the battery modules in the battery module list are arranged according to increasing wear, wherein the respective time period is longer the less wear the respective battery module has been subjected to.

In this case, the battery module which was connected for a longest time period in a half-cycle directly proceeding the half-cycle can be connected for a shortest time period in the half-cycle.

The respective time period can consist of partial time periods separated from one another by at least one interruption. The number and duration of the interruptions can then be selected depending on a voltage made available by the respective battery module and a desired voltage profile of the AC voltage between a start time of a temporally first of the partial time periods and an end time of a temporally last of the partial time periods, with the result that, by means of pulse width modulation, the desired voltage profile is approximated more effectively.

BRIEF DESCRIPTION OF THE DRAWINGS

Exemplary embodiments of the disclosure will be explained in more detail with reference to the drawings and the description below. In the drawings.

DETAILED DESCRIPTION

In a first exemplary embodiment of the disclosure, a balancing method between modules of a polyphase battery system, i.e. a battery system with BDI, is described. The balancing method comprises prioritization of the battery modules for the generation of the sinusoidal voltage profile. In this case, a module is awarded higher priority for use in the generation the higher its performance capability. This can be determined, for example, on the basis of the state of charge. As an alternative or in addition, the state of wear of the module can be taken into consideration, wherein a higher priority is awarded for use in the generation the lower the state of wear.

The state of wear of a module can be estimated, for example, on the basis of the total time period for which the module has been used. In addition or as an alternative, the determination of the state of wear can be based on one or more measurements at the module, for example an impedance measurement and/or a capacitance measurement.

The prioritization limits the use of the modules with a weaker performance which are weaker owing to the level of wear or the present state of charge than other modules and instead causes increased utilization of the modules with a greater performance. Further weakening and/or ageing of the weaker modules is thus limited. This causes an extension of the usability of these modules and therefore longer and improved usability of the overall system.

In battery module systems with direct converters (BDIs), modules can be connected and disconnected individually. In the process, in addition it is possible to select between positive and negative connection. As a result, approximately sinusoidal AC voltage profiles can be generated with a battery module system with a direct converter.

Figure 1:
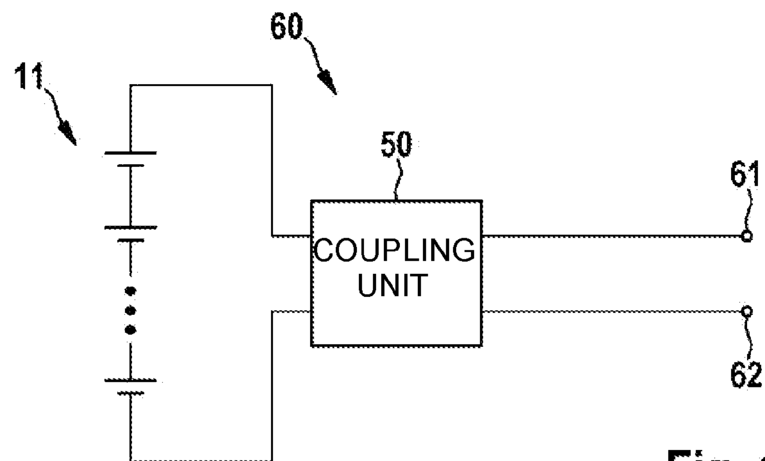
FIG. 1 shows a battery module comprising a coupling unit in accordance with the prior art.
Figure 2:
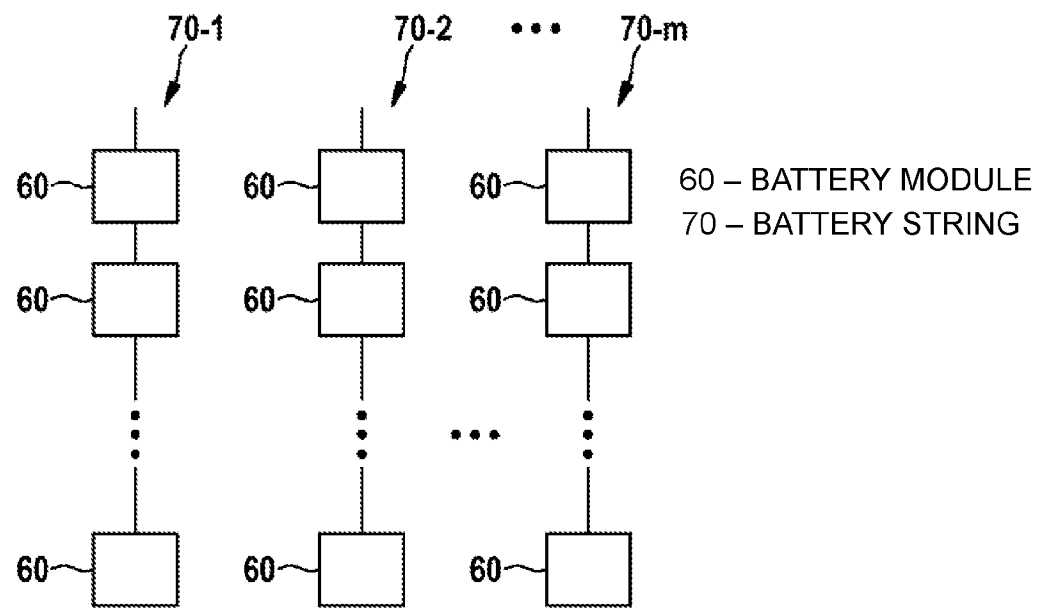
FIG. 2 shows a battery comprising n battery module strings in accordance with the prior art.
Figure 3:
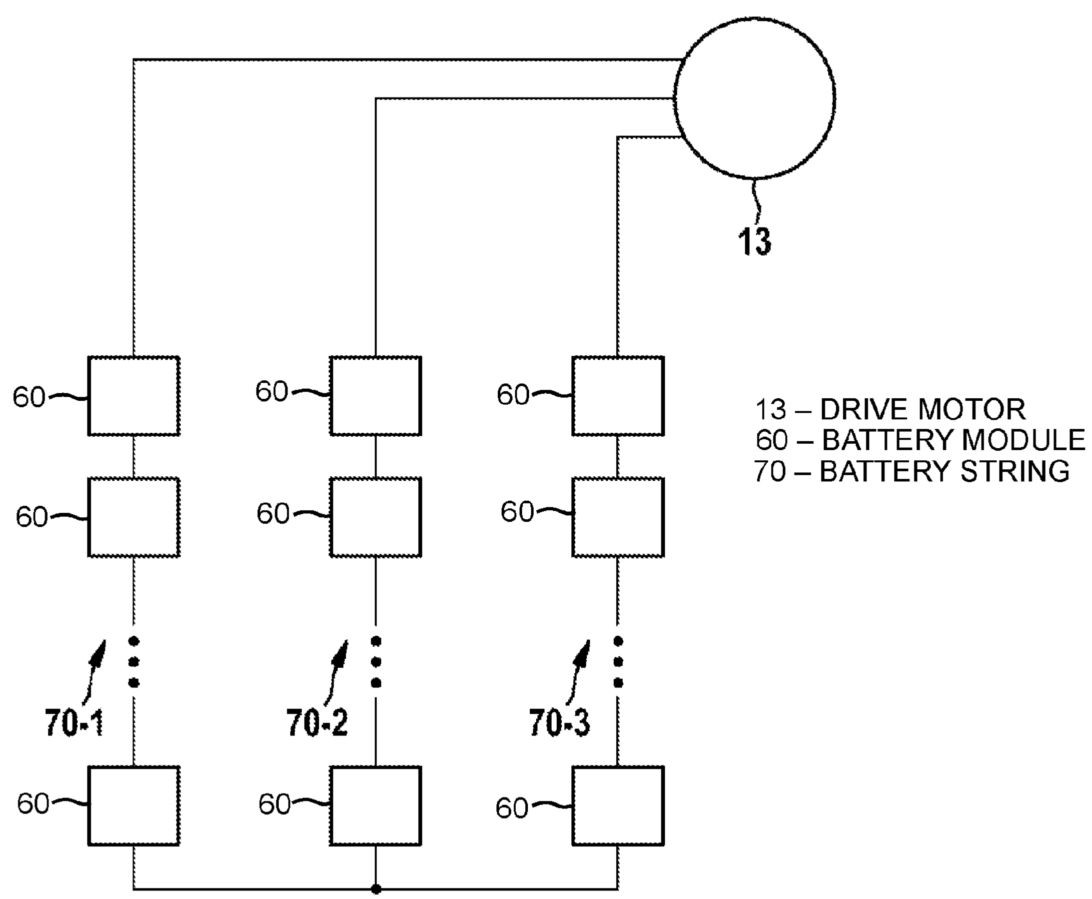
FIG. 3 shows a drive system comprising a battery comprising three battery module strings in accordance with the prior art.
Figure 4:
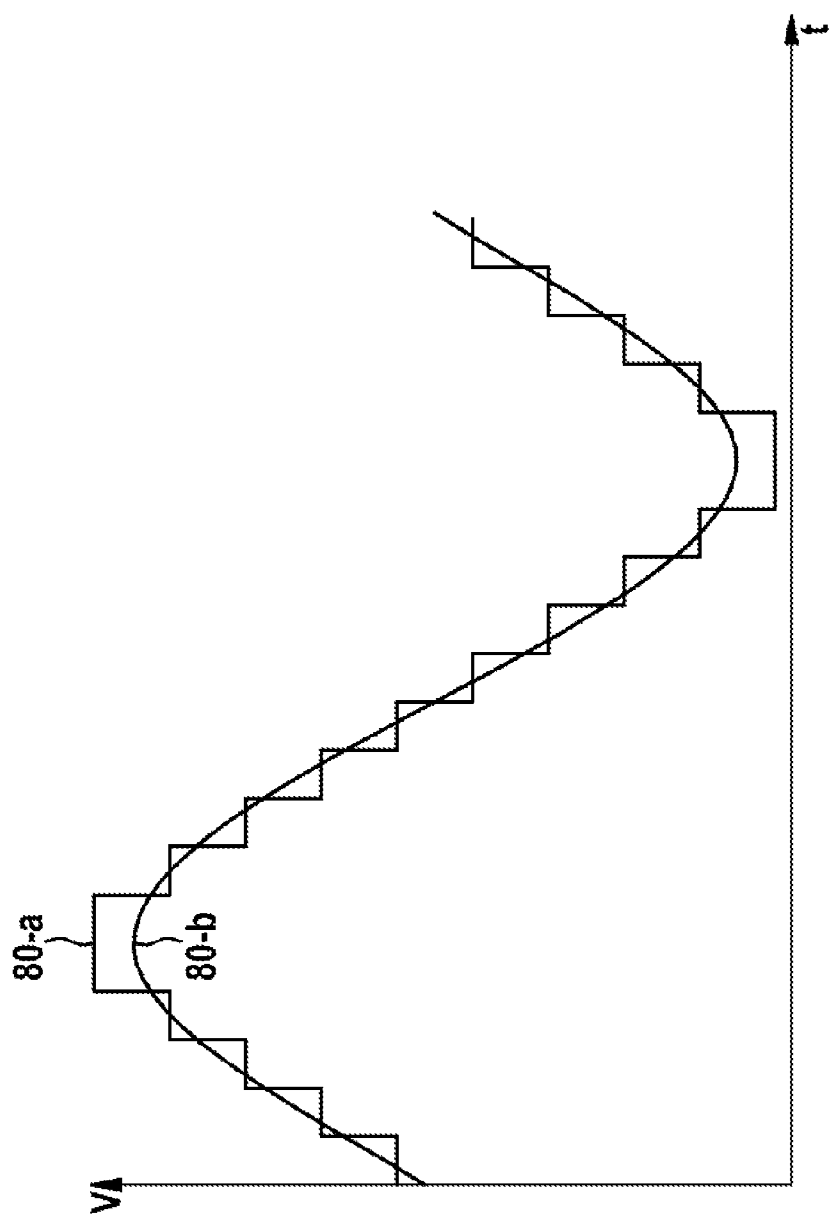
FIG. 4 shows a profile over time of an output voltage of a battery module string.
Figure 5:
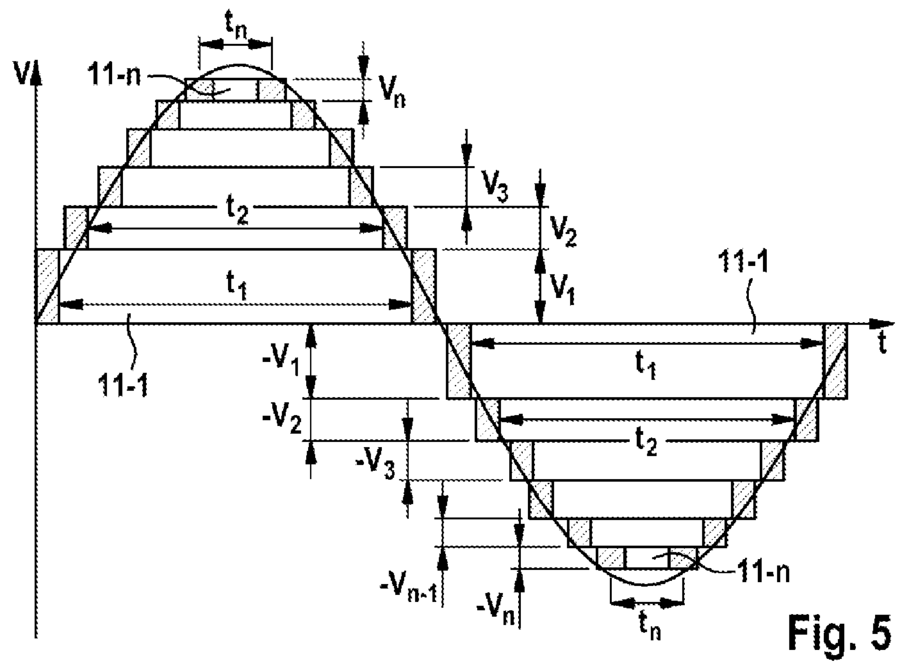
FIG. 5 shows an exemplary profile over time of an output voltage of a battery module string in accordance with a first embodiment of the disclosure.

In a first embodiment of the disclosure, sketched by way of example in FIG. 5, a most powerful module 11-1 of n modules in respect of SOC and/or SOH and/or use period is selected for generating a first half-cycle, and is connected positively for a duration $t1 \leq T/2$ for generating a voltage V1, wherein T is the period duration. If the voltage made available by the most powerful module 11-1 is greater in magnitude than |V1|, pulse width modulation can be used by means of fast switching during the duration t1 instead of permanent connection for the duration t1 in order to provide, on average, a voltage V1.

A most closely weaker or second most powerful module 11-2 of the n modules is connected positively during the time period t1 for a time period t2≤t1. During the time period t2, the second most powerful module 11-2 makes available a voltage V2 where $|V2| \leq |V1|$. Again, fast-switching-based pulse width modulation can be used instead of permanent connection in order to make available the voltage V2 on average. The modules are connected positively in series, so that, during the time period t2, at least one voltage with a magnitude of greater than or equal to |V1|+|V2| is available.

An i-th most powerful module 11-*i*, $1<i<n$, is connected during the time period t(i−1) for a time period $ti \leq t(i-1)$. During the time period ti, the i-th most powerful module 11-*i* makes available a voltage Vi where $|Vi| \leq |V(i-1)|$. Again, pulse width modulation can be used to make available the voltage Vi on average. The modules are connected positively in series, with the result that, during the time period ti, at least one voltage with a magnitude of greater than or equal to $|V1|+|V2|+ \ldots +|V(i-1)|+|Vi|$ is available.

Figure 6:
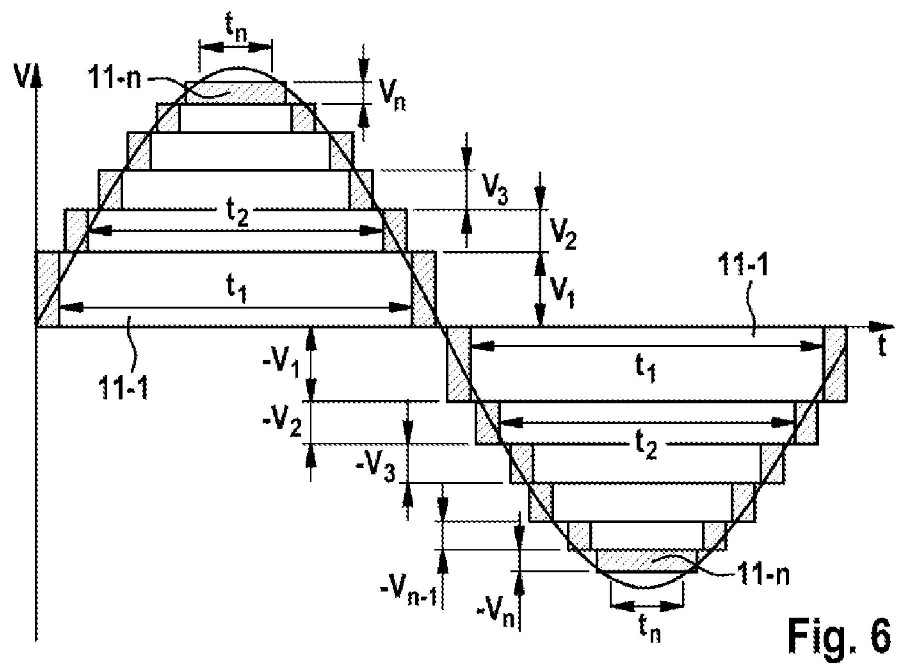
FIG. 6 shows an exemplary profile over time of an output voltage of a battery module string in accordance with one variant of the first embodiment of the disclosure.

A weakest module 11-*n* is connected during the time period t(n−1) for a time period $tn \leq t(n-1)$. During the time period tn, the weakest module 11-*n* makes available a voltage Vn where $|V_n| \leq |V(n-1)|$. The modules are connected positively in series, with the result that, during the time period tn, at least one voltage is available whose magnitude is $|V1|+|V2|+ \ldots +|V(n-1)|+|Vn|=Vmax$. Vmax is then the amplitude of the AC voltage. Again, pulse width modulation can be used in order to make available the voltage Vn on average. This variant of the first embodiment is illustrated by way of example in FIG. 6.

The intervals t1, t2, . . . , tn are centered around the time t0+T/4, wherein the half-cycle begins at t0, for the generation of the first half-cycle of a voltage profile approximating a sinusoidal curve.

In this first embodiment, the assignment of interval to module is kept in the second half-cycle. That is to say that, in the second half-cycle, the most powerful module weakest module 11-1 is again connected for a time period t1, the i-th most powerful module 11-*i*, $1<i<n$, is again connected for a time period $ti \leq tj$, for all $1 \leq j<i$, and the weakest module 11-*n* is again connected for a time period $tn \leq tj$ for all $1 \leq j \leq n$. In the second half-cycle, the connection is negative, however. The magnitudes of the generated voltages are the same as in the first half-cycle. Again, the intervals t1, t2, . . . tn are centered, but around the time t0+3*T/4 in the second half-cycle.

The hierarchization of the modules according to how powerful they are can be performed using calculated and/or measured variables. Thus, for example, the total use duration of the modules in the BMS can be tracked using the connection durations and can be used for the hierarchization according to power level. In addition or alternatively, a present state of charge of the modules can be determined on the basis of measured values such as voltage, current and/or capacitance, and the hierarchization of the modules can take place according to state of charge.

In this case, it is advantageous to update the hierarchization after each period so that actual states of charge, wear and/or ageing are used for the hierarchization.

Figure 7:
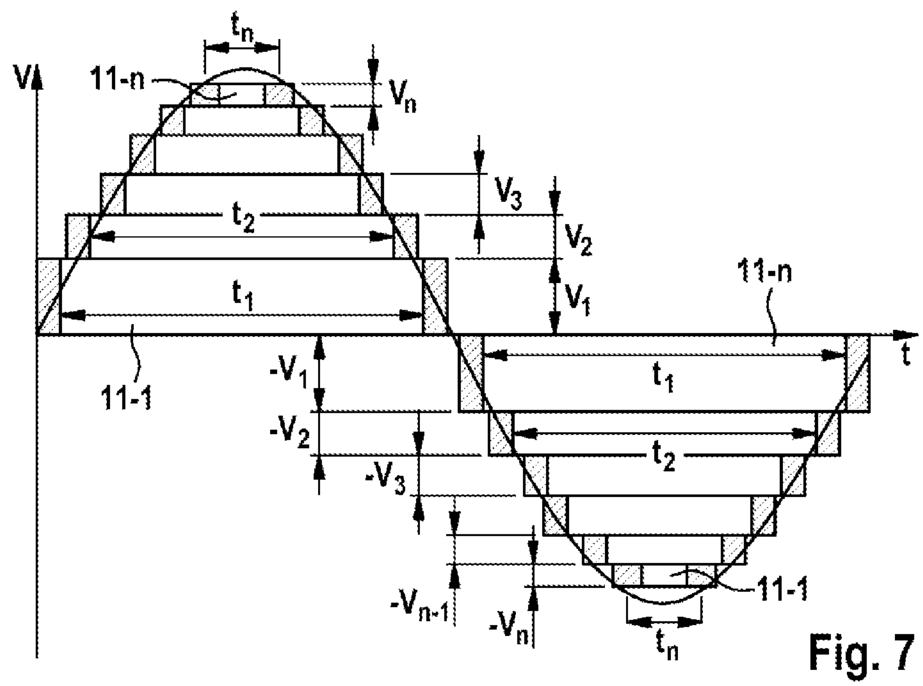
FIG. 7 shows an exemplary profile over time of an output voltage of a battery module string in accordance with a second embodiment of the disclosure.
Figure 8:
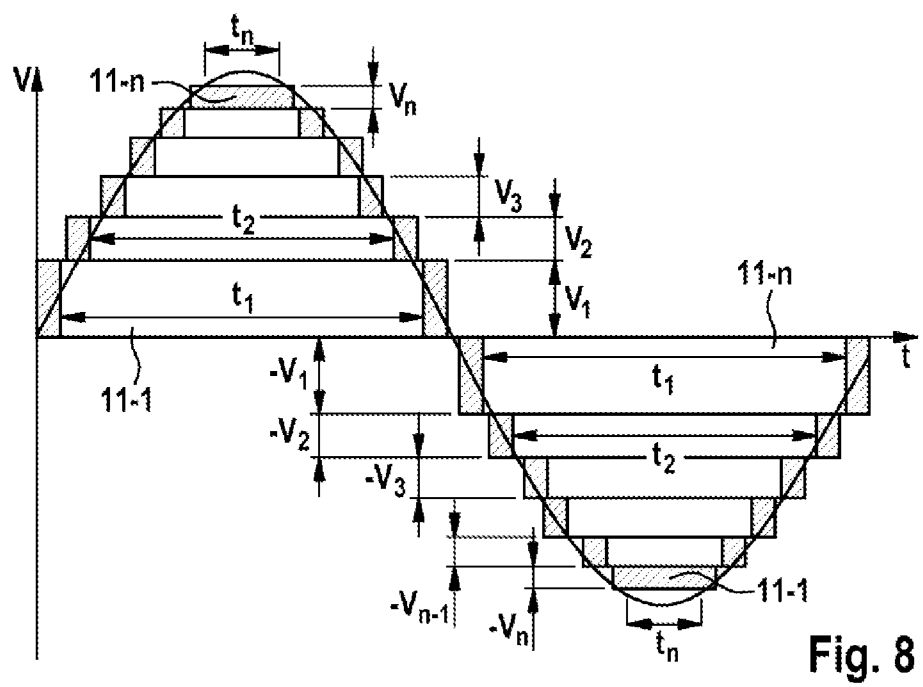
FIG. 8 shows an exemplary profile over time of an output voltage of a battery module string in accordance with one variant of the second embodiment of the disclosure.

In a second embodiment, sketched by way of example in FIG. 7, it is determined that the assignment of time period to module is inverted in the second half-cycle. That is to say that, in the second half-cycle, the module 11-*n* which was connected for the duration $tn \leq tj$, for all $1 \leq j<n$, in the first half-cycle is connected in the second half-cycle for a time period t1. The module 11-1 which was connected for the duration t1 in the first half-cycle is connected in the second half-cycle for a time period $tn \leq tj$, for all $1 \leq j<n$. And the module 11-*i* which was connected for the duration ti, $1 \leq i<n$ in the first half-cycle is connected in the second half-cycle for a time period t(n−i). FIG. 8 shows a variant of the third example shown in FIG. 7, in which, in addition, fast switching of the modules connected for the shortest amount of time per half-cycle is used in order to match the amplitude.

In the second embodiment, the loading of the modules within a period is identical or approximately identical. In particular, the loading of the modules which are connected for the longest in a half-cycle and for the shortest in the other half-cycle is identical.

If the duration ti and the voltage Vi are selected, however, such that different total loads per period result for different i, it is possible to hierarchize the different i according to the total loads per period. The weakest module can then be connected for the duration ti in the first half-cycle for which the total load is at the lowest in the two half-cycles. Correspondingly, more powerful modules can be subjected to greater loads and the most powerful module can be subjected to the greatest load.

In a third embodiment, the connection is not performed according to power, but according to voltage made available. In order to increase the magnitude of the voltage by a magnitude |Vi|, the module whose voltage made available is greater than or equal to |Vi| in magnitude and whose magnitude has the smallest discrepancy in relation to |Vi| is then connected. Thus, a particularly good approximation to a sinusoidal profile can be achieved.

The invention claimed is:

1. A method for generating a periodic AC voltage at poles of a battery system comprising:

measuring, with a first apparatus, a plurality of voltage profiles of a plurality of battery modules connected in a battery string, each battery module being configured to be electrically connected and disconnected to poles of the battery string, and each voltage profile corresponding to one battery module in the plurality of battery modules;

determining, with a second apparatus, a state of wear of each battery module in the plurality of battery modules based on the plurality of voltage profiles;

arranging, with a battery management system, the plurality of battery modules in a battery module list in an order according to an increasing state of wear using the determined state of wear for each battery module, and wherein the battery string is configured to generate an AC voltage by connecting and disconnecting each of the battery modules in order based on the battery module list to generate the AC voltage with a sinusoidal form in which each battery module in the plurality of battery modules is connected for a non-zero time, in which a first battery module in the plurality of battery modules at a first position in the list, the first battery module having a first state of wear, remains activated for a longer time duration in each cycle of the AC voltage than a second battery module in the plurality of battery modules at a second position in the list, the second battery module having a second state of wear that is greater than the first state of wear.

2. A battery management system comprising:

a first battery string comprising a first plurality of battery modules connected in the first battery string, each battery module being configured to be electrically connected and disconnected to poles of the first battery string;

a first apparatus configured to measure a first plurality of voltage profiles, each voltage provide corresponding to one battery module in the first plurality of battery modules;

a second apparatus configured to determine a state of wear of each battery module in the first plurality of battery modules based on the first plurality of voltage profiles;

wherein the battery management system is further configured to arrange each of the first plurality of battery modules in a first list in an order according to an increasing state of wear using the determined state of wear for each battery module in the first plurality of battery modules, and wherein the first battery string is configured to generate a first AC voltage by connecting and disconnecting each of the first plurality of battery modules in order based on the first list to generate the first AC voltage with a sinusoidal form in which each battery module in the first plurality of battery modules is connected for a non-zero time, in which a first battery module in the first plurality of battery modules at a first position in the first list, the first battery module having a first state of wear, remains activated for a longer time duration in each cycle of the first AC voltage than a second battery module in the first plurality of battery modules at a second position in the first list, the second battery module having a second state of wear that is greater than the first state of wear.

3. The battery management of claim 2, wherein the first plurality of battery modules are configured to be electrically connectable positively to the poles of the first battery string.

4. The battery management of claim 2, wherein the first plurality of battery modules are configured to be electrically connectable negatively to the poles of the first battery string.

5. The battery management of claim 2, wherein the first plurality of battery modules are configured to be electrically connectable individually to the poles of the first battery string.

6. The battery management of claim 2, wherein the first plurality of battery modules are configured to be electrically connectable in series to the poles of the first battery string.

7. The battery management system of claim 2 further comprising:

a second battery string comprising a second plurality of battery modules connected in the second battery string, each battery module in the second plurality of battery modules being configured to be electrically connected and disconnected to poles of the second battery string;

the first apparatus being configured to measure a second plurality of voltage profiles, each voltage profile in the second plurality of voltage profiles corresponding to one battery module in the second plurality of battery modules;

the second apparatus being configured to determine a state of wear of each battery module in the second plurality of battery modules based on the second plurality of voltage profiles;

wherein the battery management system is further configured to arrange the second plurality of battery modules in a second list in an order according to an increasing state of wear using the determined state of wear for each battery module in the second plurality of battery modules, wherein the second battery string is configured to generate a second AC voltage by connecting and disconnecting each of the second plurality of battery modules in order based on the second list to generate the second AC voltage with the sinusoidal form in which each battery module in the second plurality of battery modules is connected for a non-zero time, in which a first battery module in the second plurality of battery modules at a first position in the second list, the first battery module having a first state of wear, remains activated for a longer time duration in each cycle of the second AC voltage than a second battery module in the second plurality of battery modules at a second position in the second list, the second battery module having a second state of wear that is greater than the first state of wear, and wherein the first AC voltage is a first phase of a polyphase output and the second AC voltage is a second phase of the polyphase output.

* * * * *